Sept. 15, 1959
H. W. SHEA
2,904,518
METHOD FOR CONTROLLING THE LEVEL OF A
GRAVITATING COMPACT BED OF SOLIDS
Filed March 16, 1956
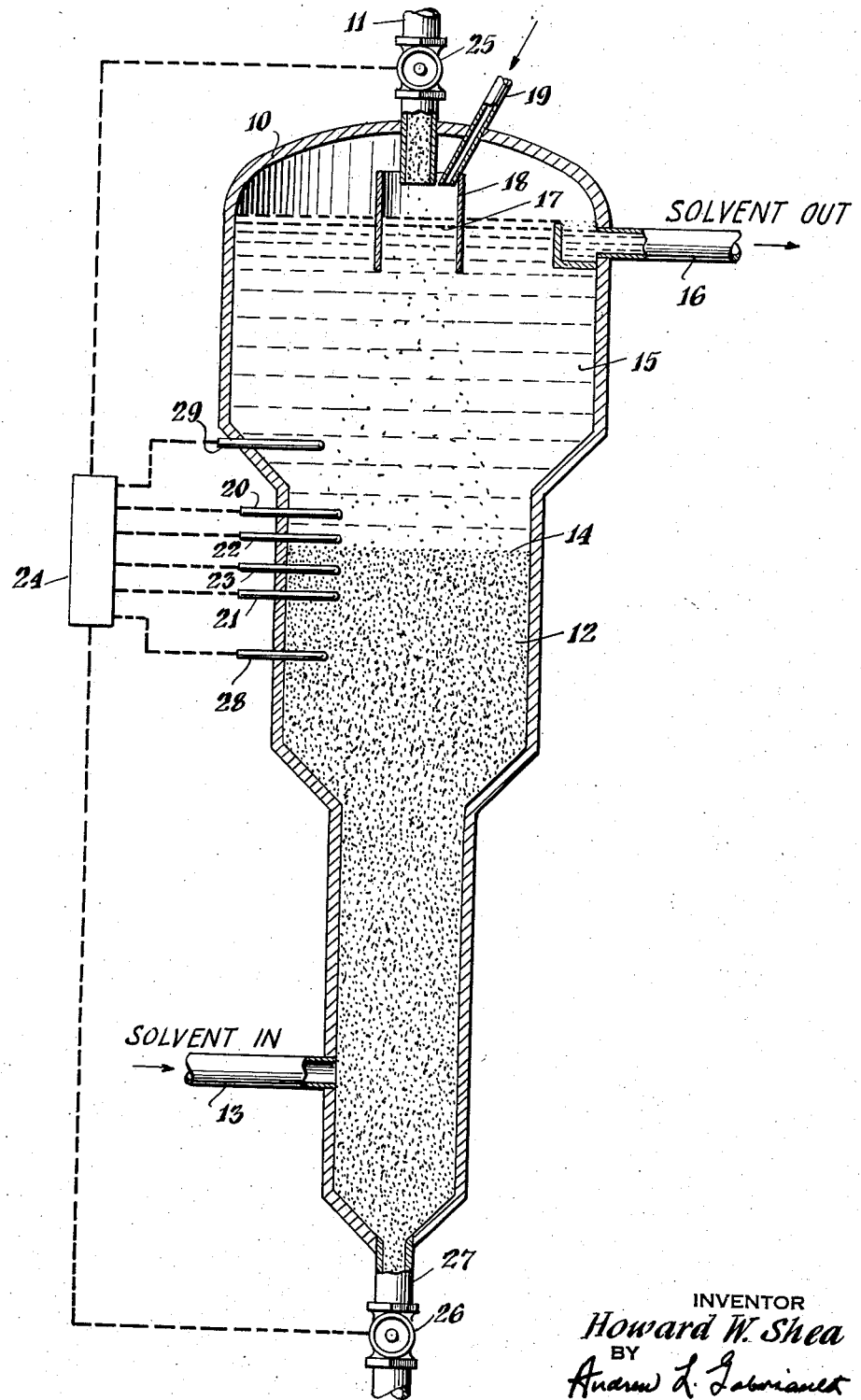
INVENTOR
Howard W. Shea
BY
Andrew L. Gabriel
ATTORNEY United States Patent Office 2,904,518
Patented Sept. 15, 1959

2,904,518

METHOD FOR CONTROLLING THE LEVEL OF A GRAVITATING COMPACT BED OF SOLIDS

Howard W. Shea, Mount Royal, N.J., assignor to Socony Mobil Oil Company, Inc., a corporation of New York Application March 16, 1956, Serial No. 572,099

5 Claims. (Cl. 252—414)

This invention is concerned with processes for contacting liquids with a substantially compact columnar mass of granular solids. More particularly, it relates to a method for maintaining the bed of solids in such processes at a substantially constant height.

Typical of the operations to which this invention may be applied is the process for treating mineral oils with solid granular adsorbents for the purpose of removing small amounts of undesirable impurities from the oil. This invention is also applicable to a variety of other processes, including liquid phase conversion of hydrocarbons in the presence of granular catalytic or inert material, purification of water with granular ion exchange materials, and revivification of solid adsorptive material through contact with a liquid solvent.

One of the most desirable methods of operating such processes is to cause the liquid and solids to flow through the contacting zone countercurrently, and in order to achieve efficiency it is frequently necessary that the solids exist as a compact bed within the zone. It is, also, very important that this bed be maintained at a substantially constant height throughout the treating operations. However, such maintenance presents a rather delicate problem, because the solids in the bed are continuously moving downwardly and tend to lower the bed level while the liquid moving upwardly tends to raise it. If the bed rises too high, substantial quantities of solids will be carried out with the effluent liquid, resulting in recovery problems in other parts of the system. A bed level which is too low will yield a liquid which is insufficiently contacted.

The key to this problem is the discovery of a suitable means for measuring the level of the bed so that adjustments in solids inlet or withdrawal streams can be made to maintain it at the desired height. While various operable systems have been devised for this operation, none of them has been completely satisfactory, particularly where relatively low volume beds are employed.

It has now been discovered that the level of a compact solids bed immersed in a liquid can be accurately determined in certain types of operations by measuring temperatures at a plurality of points around the desired bed level. This system has been found to be much more accurate than those of the prior art, and is readily adaptable to automatic controls.

It is an object of this invention to provide a method for accurately determining the level of a compact solids bed which is moving downwardly countercurrently to upwardly flowing liquid.

Another object of this invention is to provide a countercurrent liquid-solids contacting process in which the solids are maintained as a substantially compact bed of substantially unvarying height.

A very specific object of this invention is to provide a process for removing adhering oil from solid adsorbents by means of a liquid solvent.

These and other objects of this invention will be better understood by referring to the attached drawing, which is a diagrammatic sketch of an apparatus for washing granular solid adsorbents to which this invention may be applied.

Broadly, this invention provides that solids move through the contacting zone as a compact bed, to the lower section of which liquid is supplied. The liquid flows upwardly through the bed and a liquid body is maintained above the bed. Solids are passed onto the upper surface of the bed at a temperature which is substantially different from the temperature at which liquid is supplied to the bed. The relative rates of solids and liquid supply are maintained such that the heat content of the liquid supplied exceeds the heat content of the solids supplied. Also, the liquid velocity within the bed is maintained low enough that the solids in the bed touch and rest upon each other as they move downwardly through the contacting zone. The upper surface of the solids bed, and therefore the solids bed height, is maintained within a narrow range of levels by measuring the temperature at the upper end of the range and the temperature at the lower end of the range and adjusting the rate of solids supply or removal from the bed to maintain a temperature differential between the two points.

One process to which this invention may be applied is a continuous lubricating oil percolation process of the type described in detail and claimed in U.S. Patent No. 2,701,786. Briefly, in that process, the lubricating oil to be treated is heated and passed upwardly through a downwardly gravitating columnar mass of solid adsorbent within a confined treating zone. This adsorbent acts to remove color bodies and other impurities from the oil.

After this contacting, the adsorbent is washed free of occluded oil, then dried and passed to a regenerator, wherein the impurities are burned from the adsorbent. It is then returned to the treating zone for re-use therein.

The drawing illustrates the application of this invention to the washing step. The hot adsorbent with occluded oil enters the upper end of washing vessel 10 through passageway 11. A substantially compact bed 12 of adsorbent is maintained within the lower section of the washing zone. To the lower section of this bed solvent is supplied through passage 13.

Solvents which have been found to be particularly suitable to effect the desired removal of oil include carbon tetrachloride, normal heptane, normal octane, petroleum naphtha boiling within the range 100–400° F. and carbon disulfide. A preferred solvent is a paraffinic naphtha boiling within the range 210–300° F.

The solvent supplied at 13 flows upwardly through the adsorbent bed 12 at a rate which is insufficient to prevent the adsorbent particles in bed 12 from touching and resting upon each other. Oil is dissolved in the solvent as it flows upwardly and the oil-containing solvent discharges from the upper surface of bed 12 into a liquid body 15 maintained above bed 12. Solvent, with dissolved oil, is removed from washer 10 through passageway 16. The adsorbent entering through passageway 11 will, in most desirable operations of the continuous percolation process, be at a temperature above the boiling point of the solvent. For example, the adsorbent entering through passageway 11 might be at 350° F., while the solvent might have an end boiling point of 300° F. In order to avoid the undesirable results of frothing of the adsorbent and liquid, due to boiling of some of the solvent upon initial contact with this hot adsorbent, confined region 17 is maintained within liquid body 15 laterally enclosed by a cylinder 18. The hot adsorbent is supplied to region 17 and the confining members 18 restrict the region of frothing to that area and do not allow adsorbent which may be buoyed up by the frothing to escape through passage 16. In addition, a cold stream of solvent, suitable to rapidly reduce the temperature of the adsorbent below the solvent boiling point may be supplied to region 17 through passage 19.

Operation of this washer according to this invention requires that the solvent pass upwardly through bed 12 at a rate which is insufficient to prevent the downwardly moving particles in bed 12 from resting upon and touching each other. Preferably, the solvent velocity to bed 12 should be such that the pressure gradient does not exceed $(1-F-R)(S-L)$ pounds per square foot per foot of bed height. Still more preferably, the pressure should not exceed $0.75(1-F-R)(S-L)$ pounds per square foot per foot of bed height, where $F=$ the void fraction of the solids on the bulk basis, $R=$ the pore fraction of the solids on the bulk basis, $S=$ the true density of solids in pounds per cubic foot, and $L=$ the density of the liquid in pounds per cubic foot. The term "bulk basis" is used herein to mean measurement on a volume of solids as they exist when poured into an open container. For a fuller's earth adsorbent of a size ranging from 15–30 mesh Tyler, $F$ might be about 0.44, $R$ about 0.35, and $S$ about 35 pounds per cubic foot.

A second requirement of this invention is that the heat content of the adsorbent passing onto the upper surface 14 of bed 12 be less than the heat content of the solvent supplied to the bed through passageway 13. Preferably, the heat content of the solvent should exceed that of the adsorbent by at least 10 percent. The term "heat content" as used herein in describing and claiming this invention, indicates the product of the mass flow rate (e.g., pounds per hour) and the specific heat of the particular material referred to.

The third requirement for operation according to this invention is that the temperature of the solids, just prior to their reaching the bed surface 14, be different from the temperature of the naphtha within bed 12. Preferably, there should be a 10° F. difference between the two, and still more preferably, a 25° F. difference.

When these three requirements are met, there will be rapid heat exchange between solvent and adsorbent within the upper inch or two of bed 12. The bed surface may then be accurately controlled within a narrow range of levels by measuring the temperatures at the lower end of the range and at the higher end of the range, for example, at points 20 and 21, or alternatively 22 and 23. When the bed surface is between the two points, there will be a substantial temperature differential between them. When it is above or below them their temperatures will be substantially the same. The rate of either the solids supply to, or withdrawal from bed 12, may then be controlled in response to these temperature measurements to maintain the bed surface 14 within a narrow range. This may be done manually or by an automatic controller 24 which can operate either a valve 25 in inlet passageway 11 or valve 26 in outlet passageway 27.

In order to insure that the bed surface is between the desired two points, two check points may also be utilized, one at a location like 28, substantially below the desired range of levels within which it is desired to maintain bed surface 14, and the other at a point like 29, substantially above said range. When the bed surface is properly located, the temperature measurement at the upper end of the range (point 20 or 22) will be identical with that measured at point 29, while the temperature at the lower end of the range (point 21 or 23) will be identical with that at point 28. It is preferable that the temperature differential between the two points at the upper and lower ends of the desirable range of levels be at least 5° F.

Obviously, although this invention has been described in connection with one particular type of liquid-solids contacting, it has wide applicability over the broad field of counter-current liquid-solids contacting. It is only necessary that the three requirements noted above are met. That is, (1) the temperature of the liquid supplied to the bed is different from the temperature of the solids as the solids are supplied to the bed surface, preferably at least 10° F. different, still more preferably 25° F. different; (2) the heat content of the liquid supplied to the bed exceeds that of the solids supplied thereto, preferably by at least 10 percent; and (3) the pressure gradient due to liquid flow through the solids bed does not exceed that which will cause the particles to fail to touch or rest upon each other. Preferably, the pressure gradient should be not greater than is defined in the equations given above.

When these three conditions are met, the particular configuration or design of contacting vessel in no way influences the operation according to this invention, nor do the particular liquid and solids which the system employs.

The specific range of levels within which the solids bed is to be controlled will, of course, vary considerably with the type of process to which the invention is applied. Influential factors are the sensitivity of contact time between solids and liquids, the size of the liquid body above the bed, and the size of the bed itself. It has been found desirable in the washing of solid adsorbents with solvents to maintain the bed surface within a range of about 12 inches, and still more preferably about 6 inches.

Temperature measurements may be made either within the liquid body and solids bed or at their periphery where they are confined by the walls of the contacting vessel.

In a typical operation of a naphtha washer in a continuous percolation process according to this invention, 2800 pounds per hour of clay, mixed with 3050 pounds per hour of oil, were supplied through pipe 11 to region 17 within liquid body 15 at about 355° F. Also supplied to region 17 were about 8900 pounds per hour of naphtha boiling within the range 200–330° F. Mixtures of this naphtha with the clay and oil resulted in a solids temperature of 200° F. as the solids dropped from the lower end of region 17. The solids temperature was about 190° F. just prior to the solids reaching the upper surface 14 of bed 12. Naphtha was passed upwardly through the solids bed at a rate of 1490 pounds per hour and picked up while flowing therethrough 1560 pounds per hour of oil, the remainder of the oil being separated from the solids in the liquid body 15. This naphtha was supplied to the lower end of the bed at a temperature of about 100° F. Within about the upper inch of bed 12 the clay was cooled from 190–100° F. The temperatures were measured at four points immediately adjacent the desired bed surface. These points were spaced about 6 inches apart. In addition, the temperature was also measured at a level 1 foot above the uppermost of these points and 1 foot below the lowermost of them. It was found that a temperature gradient of about 90° F. could easily be maintained between the innermost two points, like 22 and 23 in the drawing, which were spaced just 6 inches apart and that the bed level could be maintained within this 6 inch range.

This invention is intended to include all changes and modifications of the examples herein chosen for purposes of disclosure which do not constitute departures from the spirit and scope of the invention.

I claim:
1. In a process for the countercurrent contacting of liquids and granular solids, wherein the liquid is supplied to the contacting zone at a temperature at least 10° F. different from that of the solids, the improvement which comprises: maintaining a downwardly gravitating, substantially compact bed of granular solids within the lower section of a confined contacting zone; continuously removing a stream of solids from the lower section of said bed; supplying liquid to be contacted to the lower section of said bed and passing said liquid upwardly through said bed at a velocity below the velocity which will interfere with the solids particles resting upon one another as they move downwardly in the bed; maintaining a body of said liquid above said bed and passing liquid from the upper end of said bed into the lower end of said body; withdrawing liquid from the upper end of said liquid body; supplying a stream of solids to the upper surface of said bed at a temperature at least 10° F. different from the temperature at which liquid is supplied to said bed; maintaining the heat content of the liquid supplied to said contacting zone greater than the heat content of the solids supplied to said zone; maintaining the upper surface of said bed within a narrow range of levels by measuring the temperature of the liquid body at the upper end of said range of levels and the temperature of said bed with liquid flowing therethrough at the lower end of said range of levels and adjusting the solids flow in one of said solids streams to maintain a substantial difference in temperature between said two points of temperature measurement.

2. A process for the countercurrent contacting of a liquid with granular solids that are supplied to the contacting zone at a temperature at least 25° F. different from the temperature of liquid supply, which comprises: maintaining a downwardly gravitating, substantially compact bed of granular solids within the lower section of a confined contacting zone; continuously removing a stream of solids from the lower section of said bed; supplying the liquid to be contacted to the lower section of said bed and passing said liquid upwardly through said bed at a rate such that the pressure gradient through said bed is no greater than $0.75\,(1-F-R)(S-L)$ pounds per square foot per foot of bed height, where $F$=void fraction of the solids on a bulk basis, $R$=pore fraction of the solids on a bulk basis, $S$=true density of the solids in pounds per cubic foot, and $L$=the density of the liquid in pounds per cubic foot; maintaining a body of said liquid above said bed and passing liquid from the upper end of said bed into the lower end of said body; withdrawing liquid from the upper end of said body; passing a stream of solids through a confined passage into the upper section of said contacting zone at a temperature substantially different from the temperature at which liquid is supplied to said bed and discharging said stream from said passage at a level beneath the upper surface of said liquid body but above the upper surface of said bed so that solids will fall through said liquid body onto the upper surface of said bed, the temperature of said solids just prior to reaching said bed being at least 25° F. different from the temperature of the liquid supplied to said bed; maintaining the relative rates of liquid and solids supply to the contacting zone such that the heat content of the liquid supplied to the contacting zone is at least 10 percent greater than the heat content of the solids supplied to the contacting zone; maintaining the upper surface of said bed within a narrow range of levels by measuring the temperature of the liquid body and solids bed at heights removed from said narrow range and also measuring the temperature of the liquid body at the upper end of said range and the solids bed temperature at the lower end of said range, and controlling the solids flow in at least one of said solid streams to maintain a temperature difference of at least 5° F. between the temperatures measured at the upper and lower ends of said range of levels while maintaining the temperatures measured in the liquid body about the same and the temperatures measured in the solids bed about the same.

3. A process for the countercurrent contacting of a hot oil-bearing granular adsorbent with a solvent capable of dissolving said oil, which comprises: maintaining a downwardly gravitating, substantially compact bed of the adsorbent within the lower section of a confined contacting zone; continuously removing adsorbent from the lower section of said bed; supplying liquid solvent to the lower section of said bed and passing the solvent upwardly therethrough to dissolve oil from the adsorbent at a rate such that the pressure gradient due to liquid flow through the bed is not greater than $0.75\,(1-F-R)(S-L)$ pounds per square foot per foot of bed height, where $F$=void fraction of the adsorbent on a bulk basis, $R$=pore fraction of the adsorbent on a bulk basis, $S$=true density of the adsorbent in pounds per cubic foot, and $L$=the density of the solvent in pounds per cubic foot; maintaining a body of liquid solvent with dissolved oil above said bed and passing solvent from the upper end of said bed into said body; removing solvent with dissolved oil from the upper end of said liquid body; passing a stream of adsorbent with adhering oil through a confined passage into said contacting zone and discharging said stream from said passage at a level above said bed and allowing the adsorbent to fall through said body onto the upper surface of said bed, the temperature of supply of adsorbent being sufficiently above the temperature of the liquid solvent body that as the adsorbent reaches the upper surface of said bed it is at least 25° F. higher in temperature than the solvent supplied to said bed; maintaining the relative rates of liquid solvent and adsorbent supplied to said bed such that the heat content of the solvent so supplied is at least 10 percent greater than the adsorbent so supplied; maintaining the upper surface of said bed within a narrow range of levels by measuring the temperature of the liquid body at a point above said narrow range and the temperature of said bed at a point below said narrow range and, also, measuring temperatures at the upper and lower limits of said narrow range, and controlling the rate of removal of adsorbent to maintain the temperature measured above said range about the same as the temperature measured at the upper limit of said range, the temperature measured below said range about the same as the temperature at the lower limit of said range and a temperature differential of greater than 5° F. between the temperature measured at the upper and lower limits of said range.

4. In a process for the countercurrent contacting of liquids and granular solids, wherein the liquid is supplied to the contacting zone at a temperature at least 10° F. different from that of the solids and at a heat content greater than that of the solids supplied, and wherein the solids flow downwardly as a substantially compact bed through the contacting zone, through which bed liquid flows upwardly, and wherein the liquid is withdrawn from the contacting zone at a level substantially above the surface of the solids bed so that a body of liquid is maintained above said surface, the improved method for maintaining the upper surface of said bed within a narrow range of levels, which comprises: removing a stream of solids from the lower end of said bed; supplying a stream of solids to the upper surface of said bed at a temperature at least 10° F. different from the temperature at which liquid is supplied to said bed; measuring the temperature at the uppermost level of the range of levels in which it is desired to maintain the bed surface and measuring the temperature at the lowermost level of said range of levels and adjusting the solids flow in one of said solids streams to maintain at all times a substantial difference in temperature between said two points of temperature measurement.

5. A process for the continuous removal of occluded oil from a hot adsorbent material by means of a solvent whose boiling point is below the temperature of the adsorbent material, which comprises: maintaining a downwardly gravitating, substantially compact bed of adsorbent within a confined washing zone; continuously removing adsorbent from the lower section of said bed; supplying washing solvent to the lower section of said bed and passing the solvent upwardly through the bed to dissolve oil from the adsorbent at a rate such that the pressure gradient due to liquid flow through the bed is not greater than $0.75\,(1-F-R)(S-L)$ pounds per square foot per foot of bed height, where $F$=void fraction of the adsorbent on a bulk basis, $R$=pore fraction of the adsorbent on a bulk basis, $S$=true density of the adsorbent, and $L$=the density of the solvent in pounds per cubic foot; maintaining a body of the solvent with dissolved oil above the bed and passing solvent from the upper end of the bed into said body; removing solvent with dissolved oil from the upper end of said body of solvent; maintaining a laterally confined region within said body of solvent adjacent its upper end; passing adsorbent with occluded oil at a temperature above the boiling point of the solvent into said region, from which region the adsorbent falls through the liquid body onto said bed; adding cooled solvent from the exterior of the washing zone to said region in an amount suitable to rapidly cool the adsorbent below the solvent boiling point while it is still within said region but insufficient to cool the adsorbent in an amount such that the adsorbent is within 25° F. of the temperature at which solvent is supplied to said bed as the adsorbent reaches the upper surface of said bed; maintaining the rate of supply of solvent to the lower end of said bed such that the heat content of the solvent is at least 10 percent greater than the heat content of adsorbent supplied to the bed; controlling the upper surface of the bed within a narrow range of levels spanning not more than 12 inches by measuring the temperature of the body of solvent at a point above said range and the temperature of the bed at a point below said range, also measuring the temperatures at the upper and lower ends of said range, and adjusting the rate of adsorbent removal from said bed to maintain a temperature differential of at least 5° F. between the temperatures at the upper and lower ends of said range while maintaining the temperature at the upper end of said range about the same as the temperature measured thereabove in the liquid body and the temperature at the lower end of the range about the same as that measured therebelow in said bed.

References Cited in the file of this patent

UNITED STATES PATENTS

| | | |
|---|---|---|
| 1,974,992 | Musselman | Sept. 25, 1934 |
| 2,631,921 | Odell | Mar. 17, 1953 |
| 2,696,305 | Slover | Dec. 7, 1954 |
| 2,771,407 | Penick | Nov. 20, 1956 |